May 22, 1951 J. C. FERGUSON 2,553,566

PHASE MODULATED WAVE GENERATOR

Filed Oct. 7, 1946

INVENTOR
JOSEPH C. FERGUSON

BY

ATTORNEY

Patented May 22, 1951

2,553,566

UNITED STATES PATENT OFFICE 2,553,566

PHASE MODULATED WAVE GENERATOR

Joseph C. Ferguson, Fort Wayne, Ind., assignor, by mesne assignments, to Farnsworth Research Corporation, a corporation of Indiana Application October 7, 1946, Serial No. 701,842

6 Claims. (Cl. 332—7)

This invention relates to a device for controlling or modulating the transit time of electrons and particularly relates to a generator for developing phase or frequency modulated waves.

It is well known that any phase modulator may be made to develop a frequency modulated output wave. Generally, any device which develops an output wave having a phase departure which is made proportional to the amplitude of the input signal is a phase modulator. On the other hand, if the frequency deviation of the output wave is made proportional to the amplitude of the input signal, then the output wave is frequency modulated. All that has to be done to arrange a phase modulator for developing a frequency modulated output wave is to provide a suitable network in its input circuit which has a characteristic that is inversely proportional to frequency. The advantages of frequency or phase modulation such as a gain in power over the more conventional amplitude modulation are well known.

A conventional frequency modulator comprises an oscillator, the frequency of which is controlled in accordance with an input signal. However, in a conventional frequency modulator of this type great difficulty has been experienced in keeping the mean or carrier frequency constant. Usually a frequency comparator network must be provided which compares the mean frequency of the wave developed by the modulated oscillator with the frequency of a constant carrier wave developed by a crystal controlled oscillator. It has also been suggested to provide a cathode ray tube having a collector electrode which is inclined with respect to the cathode ray. By deflecting the electron beam across the inclined electrode, the electron transit time may be varied. However, it will be evident that the electron transit time and consequently the phase of the output signal can only be varied within very narrow limits.

It has furthermore been proposed to provide a cathode ray tube with a magnetic field which determines the electron transit time of the electrons of the beam. By varying the magnetic field strength, the electron transit time may be varied within wide limits. However, it is well known that the impedance of a magnetic inductor increases appreciably at high frequencies such as are encountered in the transmission of television signals. It is accordingly very difficult to control the current flow through the magnetic coil of the prior art tube in accordance with the high frequency components of a television signal.

It is an object of the present invention, therefore, to provide a novel phase or frequency modulator which permits to keep the mean or carrier frequency of the output signal constant at all times without requiring special networks.

Another object of the invention is to provide a novel tube of the cathode ray type wherein the electron transit time may be controlled or modulated within comparatively wide limits.

A further object of the invention is to provide a cathode ray tube of the type referred to wherein the electron transit time is controlled in accordance with variations of an electrostatic field, thereby to effect wavelength modulation of the output signal.

In accordance with the present invention there is provided apparatus for controlling the transit time of electrons comprising means for developing an electron beam. Means are provided for modulating the intensity of the electron beam in accordance with a first signal. Two spaced surfaces are provided which have a secondary electron emission ratio of substantially unity and means are further provided for normally causing the electron beam to impact the surfaces repeatedly in succession. Further means are provided for varying the number of impacts of the electron beam on the surfaces in accordance with a second signal. Thus, the electron transit time may be varied. Means are finally provided for collecting the electrons of the beam.

For a better understanding of the invention, together with other and further objects thereof, reference is made to the following description, taken in connection with the accompanying drawing, and its scope will be pointed out in the appended claims.

Figure 1:
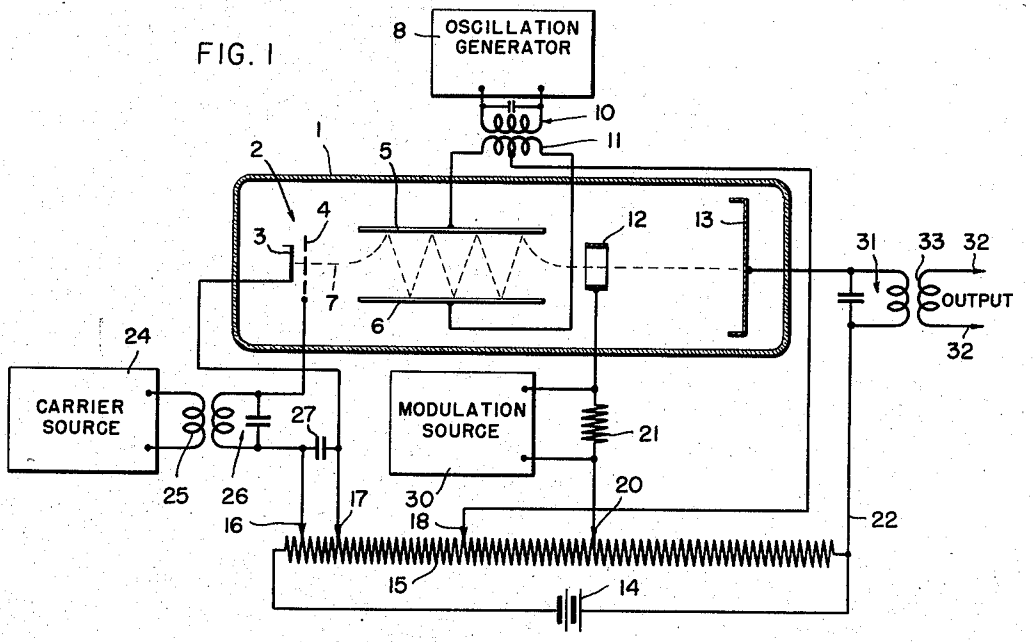
Fig. 1 is a schematic representation of a phase modulator and associated circuits embodying the present invention.

Referring to Fig. 1 of the drawing, there is illustrated a device for controlling or modulating the electron transit time which comprises evacuated envelope 1 in which an electron gun 2 is provided. Electron gun 2 has been illustrated schematically and may include cathode 3 and control grid 4, as shown. Electron gun 2 is provided for the purpose of developing an electron beam and directing it onto one of the two spaced surfaces 5 and 6. Surfaces 5 and 6 are arranged to have a secondary electron emission ratio of substantially unity. It is well known that the secondary electron emission ratio depends upon the velocity of the electrons which impact surfaces 5 and 6 as well as upon the material of which the surfaces consist or with which they are coated. By a suitable selection of the velocity of the electrons and of the material of surfaces 5 and 6 the secondary electron emission ratio can be made substantially to approach unity.

Electron beam 7 which is developed by electron gun 2 is caused to impact surfaces 5 and 6 repeatedly in succession. To this end there may be provided oscillation generator 8 having a tuned circuit 10 inductively coupled to coil 11, the terminals of which are connected to surfaces 5 and 6, respectively. The frequency of the wave impressed by oscillation generator 8 upon surfaces 5 and 6 should be such that the time duration required for a half cycle of the wave approximately equals the electron transit time between surfaces 5 and 6. Accordingly, during the time an electron travels, for example, from surface 5 to surface 6, the potential of surface 6 will reverse in such a manner as to attract the electrons towards surface 6. The electrons will accordingly always be accelerated in such a manner that they impact surfaces 5 and 6 in succession. Accelerating electrode 12 is arranged between collector electrode 13 and surfaces 5 and 6.

For the purpose of supplying operating potentials to the electrodes of tube 1 there is provided a suitable voltage source such, for example, as battery 14 having its terminals connected to voltage divider 15. By means of tap 16 on voltage divider 15 control grid 4 may be kept at a potential that is negative with respect to that supplied to cathode 3 by tap 17. Tap 18 of voltage divider 15 is connected to the midpoint of coil 11 so that surfaces 5 and 6 are maintained at a mean potential which is positive with respect to that of cathode 3. Accelerating electrode 12 is maintained at a still higher positive potential by means of tap 20 connected to accelerating electrode 12 through an impedance such as resistor 21. Collector electrode 13 is maintained at the highest positive potential through lead 22 connected to the positive terminal of battery 14.

Control grid 4 may be modulated in accordance with an input signal such as that developed by carrier source 24. The carrier wave is developed across coil 25 inductively coupled to tuned circuit 26 provided between control grid 4 and its tap 16. Condenser 27 may be arranged between control grid 4 and cathode 3 for providing an alternating current bypass.

In accordance with the present invention the electrostatic field between electron gun 2, that is, between cathode 3 and accelerating electrode 12, may be controlled or modulated. To this end there may be provided modulation source 30 which may be connected across resistor 21 of accelerating electrode 12. Thus, the potential of accelerating electrode 12 may be varied which, in turn, will vary the electrostatic field between cathode 3 and accelerating electrode 12.

The output signal may be developed across a load impedance such as tuned circuit 31 connected between lead 22 and collector 13. The output signal may be obtained from output terminals 32 connected to output coil 33 which in turn is inductively coupled to tuned load circuit 31.

The operation of the modulator of the invention will now be evident. Electron beam 7 developed by electron gun 2 is directed upon one of the surfaces 5 and 6. The intensity of the electron beam is modulated by means of control grid 4 in accordance with an input signal such as a carrier wave developed by carrier source 24. The modulated electron beam will now impact surfaces 5 and 6 repeatedly in succession. As pointed out hereinabove, the frequency of the wave impressed by oscillation generator 8 upon surfaces 5 and 6 should equal approximately the reciprocal of the electron transit time from one of the surfaces 5 and 6 to the opposite surface and back again to the first surface.

The electrostatic field developed between electron gun 2, that is, between cathode 3 and accelerating electrode 12 serves to withdraw the electrons in a direction substantially parallel to surfaces 5 and 6 and to accelerate them toward electrode 12. When the electrostatic field developed by accelerating electrode 12 is modulated in accordance with another input signal, such as that developed by modulation source 30, the electron transit time is varied by varying the number of impacts of electron beam 7 on surfaces 5 and 6. The impedance of resistance 21 which is the terminating impedance of modulation source 30 may be kept large for all frequencies so that the electron transit time may be controlled even at high frequencies with a comparatively small power.

Figure 2:
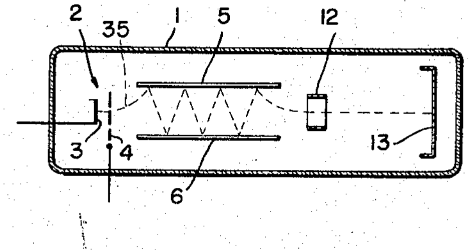
Fig. 2 is a schematic representation of the modulator tube of Fig. 1 illustrating a comparatively long electron path therethrough.
Figure 3:
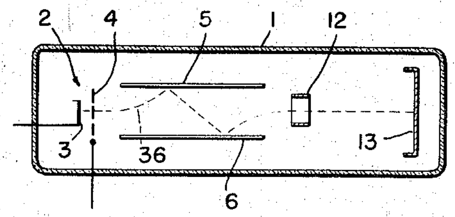
Fig. 3 is a view similar to Fig. 2 illustrating a comparatively short electron path through the tube.

Thus, as illustrated in Fig. 2, when the electrostatic field between electron gun 2 and accelerating electrode 12 is comparatively weak, electron beam 35 will oscillate between surfaces 5 and 6 for a comparatively long time. The electron transit time is accordingly made comparatively long. On the other hand, if the electrostatic field between electron gun 2 and accelerating electrode 12 is strong, electron beam 36 is caused to drift rapidly toward accelerating electrode 12 and hence will only impact surfaces 5 and 6 a few times as shown in Fig. 3. In that case the electron transit time is comparatively short.

The modulator of the present invention functions primarily as a device for controlling the electron transit time. It may, accordingly, be used for introducing a variable time delay upon an input signal impressed upon control grid 4 in accordance with a second signal impressed across resistor 21. The modulated electron beam is eventually collected by collector 13 having tuned load circuit 31 connected thereto. The modulated output signal may be obtained from terminals 32. It will be evident that the modulated output signal may have its phase modulated in accordance with the modulation signal developed by source 30. In the manner previously explained the cathode ray tube of the present invention may also be utilized for obtaining a frequency modulated output wave or, in other words, wavelength modulation. Whether the device function as a phase modulator or as a frequency modulator depends mainly upon the type of input signal impressed across resistor 21 by modulation source 30.

Figure 4:
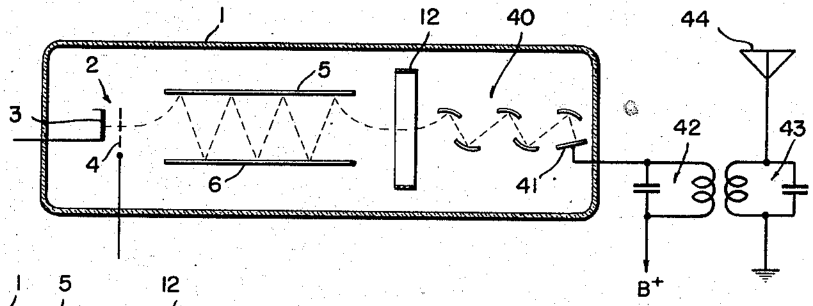
Fig. 4 is a schematic representation of a modified phase modulator and its output circuit in accordance with the invention.

Referring now to Fig. 4, in which like components are designated by the same reference numerals as were used in Fig. 1, there is illustrated a modulator in accordance with the invention wherein electron multiplier 40 is provided between accelerating electrode 12 and collector electrode 41. The electron multiplier has been illustrated by way of example as an electrostatic multiplier, but it is to be understood that any conventional multiplier may be used instead of the electrostatic multiplier 40 illustrated in Fig. 4. For the sake of clarity the circuits coupled to the electrodes of tube 1 have not been illustrated, but it will be understood that the tube may be energized in the manner explained in connection with Fig. 1.

The first multiplying stage of electron multiplier 40 is kept at a potential which may be of the order of that of accelerating electrode 12. The subsequent multiplying stages of electron multiplier 40 are kept at progressively more positive potentials, collector 41 having the highest positive potential.

A multiplied or amplified output signal is accordingly obtained in tuned load circuit 42 arranged between collector 41 and a suitable positive voltage source indicated at B+. Tuned output circuit 43 may be inductively coupled to tuned load circuit 42 and the phase or frequency modulated output wave may be radiated into space by antenna 44 which may be coupled to tuned output circuit 43.

It will be evident that the mean or carrier frequency of the modulated output wave may be kept constant by utilizing a crystal controlled oscillator as part of carrier source 24. The modulation signal will vary the phase or frequency of the output wave in the manner previously explained about a mean value determined by the frequency of the wave developed by carrier source 44. The electron transit time may be varied within comparatively wide limits by varying the potential applied to accelerating electrode 12.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for controlling the transit time of electrons comprising means for developing an electron beam, means for modulating the intensity of said beam in accordance with a first signal, two spaced surfaces having a secondary electron emission ratio of substantially unity, means for normally causing said beam to impact said surfaces repeatedly in succession, means for varying the number of impacts of said beam on said surfaces in accordance with a second signal, thereby to vary the electron transit time, and means for collecting the electrons of said beam.

2. Apparatus for controlling the transit time of electrons comprising means for developing an electron beam, means for modulating the intensity of said beam in accordance with a first signal, two spaced surfaces having a secondary electron emission ratio of substantially unity, means for normally oscillating said beam between said surfaces repeatedly, means for developing an electrostatic field to vary the number of impacts of said beam on said surfaces in accordance with a second signal, thereby to vary the electron transit time, and means for collecting the electrons of said beam.

3. Apparatus for producing wavelength modulation comprising means for developing an electron beam, means for modulating the intensity of said beam in accordance with a carrier signal, two spaced surfaces having a secondary electron emission ratio of substantially unity, means for normally causing said beam to impact said surfaces repeatedly in succession, a collector arranged to collect the electrons of said beam after their passage between said surfaces, means for developing an electrostatic field to cause the electrons impacting said surfaces to drift in a direction substantially parallel to said surfaces, and means for modulating the intensity of said electrostatic field in accordance with an input signal, thereby to modulate the length of the path of said electrons.

4. Apparatus for producing wavelength modulation comprising an electron gun for developing an electron beam, means for modulating the intensity of said beam in accordance with a first signal, two spaced surfaces having a secondary electron emission ratio of substantially unity, means for normally oscillating said beam between said surfaces repeatedly, a collector arranged to collect the electrons of said beam after their passage between said surfaces, and accelerating electrode arranged between said surfaces and said collector, means for developing an electrostatic field between said gun and said electrode, and means for modulating the intensity of said electrostatic field in accordance with a second signal, thereby to modulate the length of the path of said electrons.

5. Apparatus for producing wavelength modulation comprising means for developing an electron beam, means for modulating the intensity of said beam in accordance with a carrier signal, two spaced surfaces having a secondary electron emission ratio of substantially unity, means including an oscillation generator coupled to said surfaces for normally causing said beam to impact said surfaces repeatedly in succession, a collector arranged to collect the electrons of said beam after their passage between said surfaces, means for developing an electrostatic field to cause the electrons impacting said surfaces to drift in a direction substantially parallel to said surfaces, and means for modulating the intensity of said electrostatic field in accordance with an input signal, thereby to modulate the length of the path of said electrons.

6. Apparatus for producing wavelength modulation comprising an electron gun for developing an electron beam, means for modulating the intensity of said beam in accordance with a first signal, two spaced surfaces having a secondary electron emission ratio of substantially unity, means for normally oscillating said beam between said surfaces repeatedly, a collector arranged to collect the electrons of said beam after their passage between said surfaces, an electron multiplier arranged between said collector and said surfaces, means for developing an electrostatic field to accelerate the electrons oscillating between said surfaces in a direction substantially parallel to said surfaces, and means for modulating the intensity of said electrostatic field in accordance with a second signal, thereby to modulate the length of the path of said electrons.

JOSEPH C. FERGUSON.

REFERENCES CITED

The following references are of record in the file of this patent:

UNITED STATES PATENTS

| Number | Name | Date |
|---|---|---|
| 2,258,129 | Bruche et al. | Oct. 7, 1941 |
| 2,280,026 | Brown | Apr. 14, 1942 |
| 2,300,436 | Skellett | Nov. 3, 1942 |
| 2,372,210 | Labin | Mar. 27, 1945 |
| 2,414,843 | Varian et al. | Jan. 28, 1947 |
| 2,418,574 | Cawein | Apr. 8, 1947 |